June 22, 1926.
C. M. LOWTHER
1,589,475
NONGLARE SCREEN FOR AUTOMOBILES
Filed Sept. 28, 1923   3 Sheets-Sheet 1
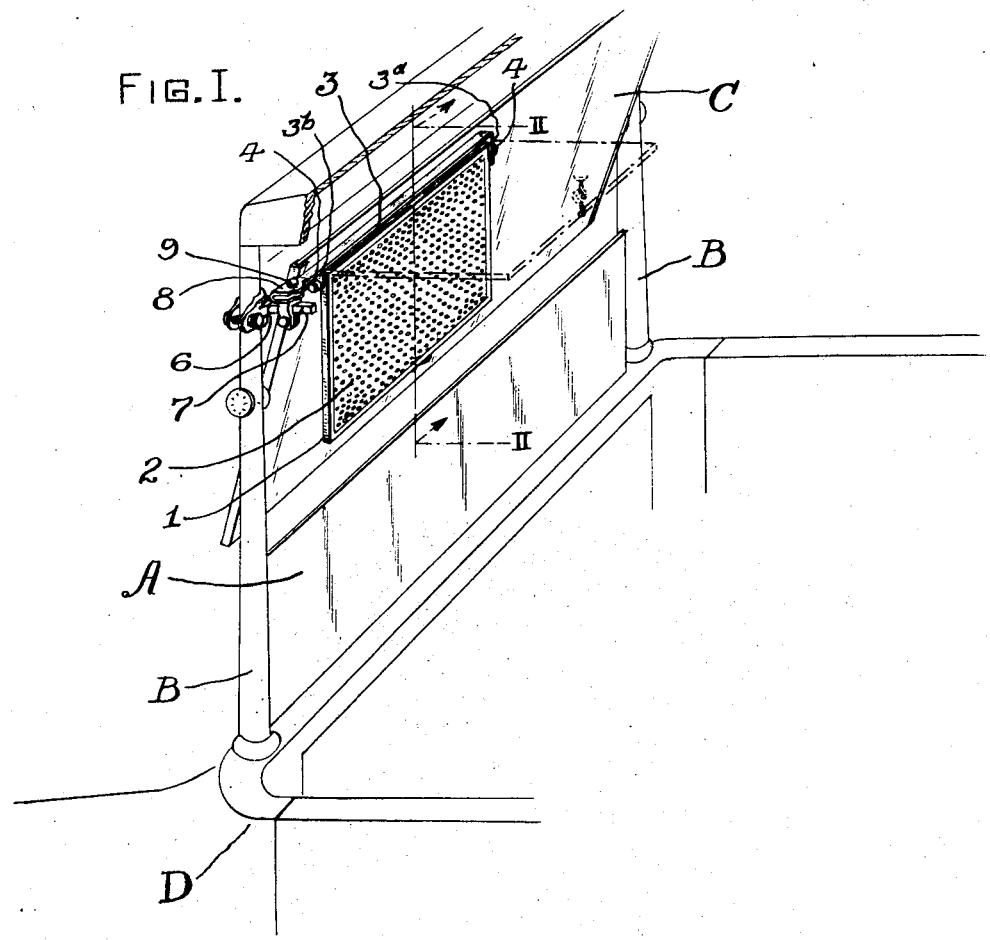
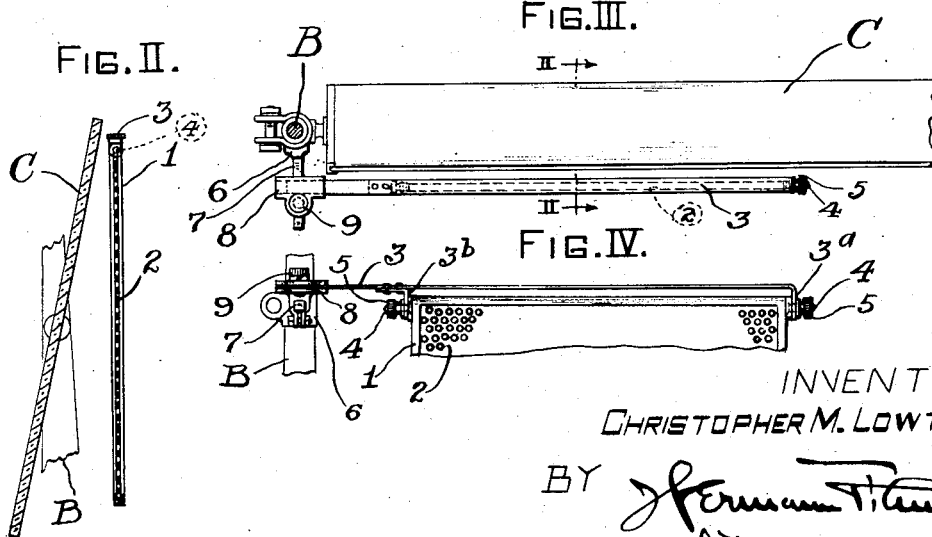
INVENTOR
CHRISTOPHER M. LOWTHER
BY
ATTORNEY June 22, 1926.
C. M. LOWTHER
1,589,475
NONGLARE SCREEN FOR AUTOMOBILES
Filed Sept. 28, 1923   3 Sheets-Sheet 2
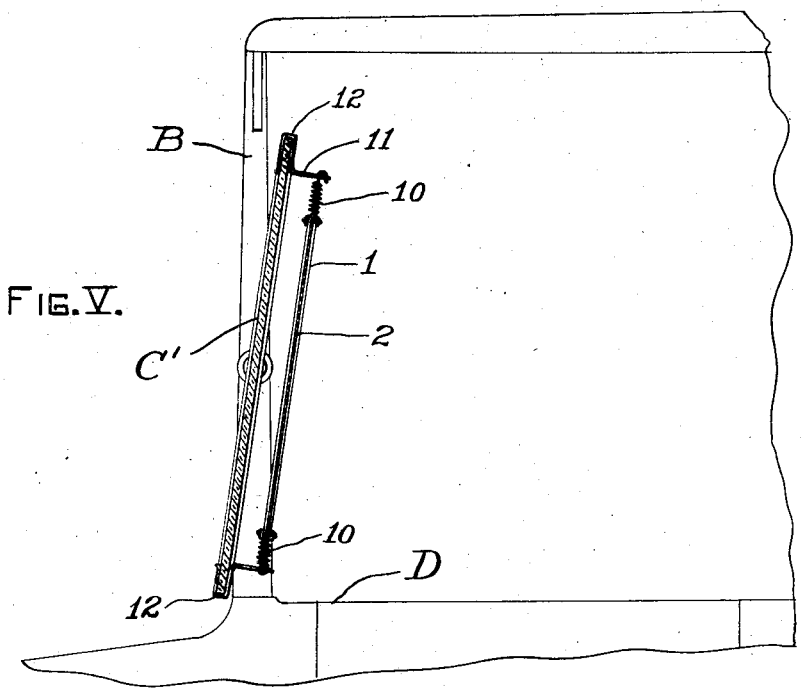
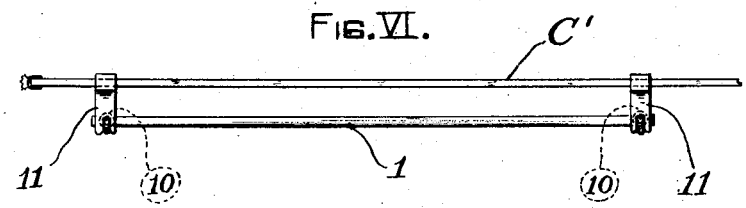
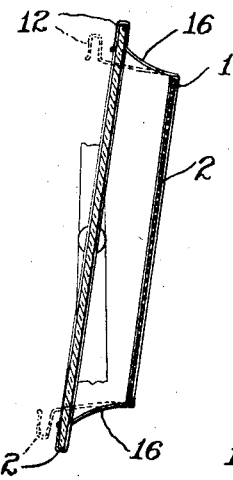 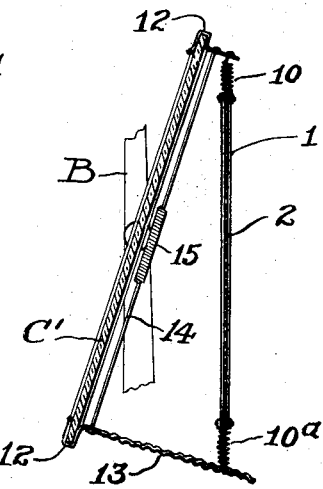
INVENTOR
CHRISTOPHER M. LOWTHER
BY
his ATTORNEY June 22, 1926.                                                          1,589,475.
C. M. LOWTHER
NONGLARE SCREEN FOR AUTOMOBILES
Filed Sept. 28, 1923         3 Sheets-Sheet 3
Fig. IX.
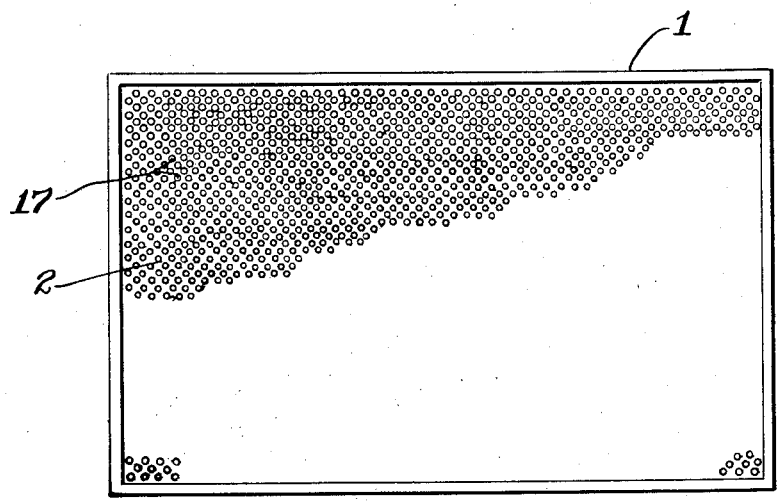
Fig. X.
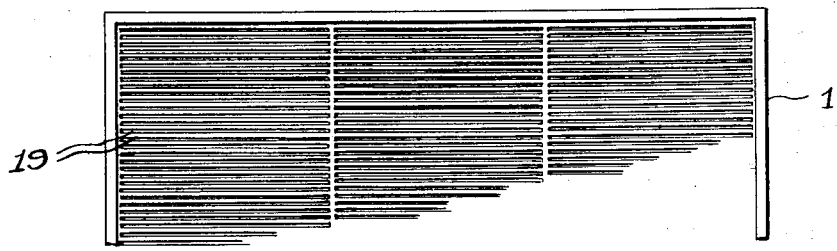
Fig. XI.                                        Fig. IXa
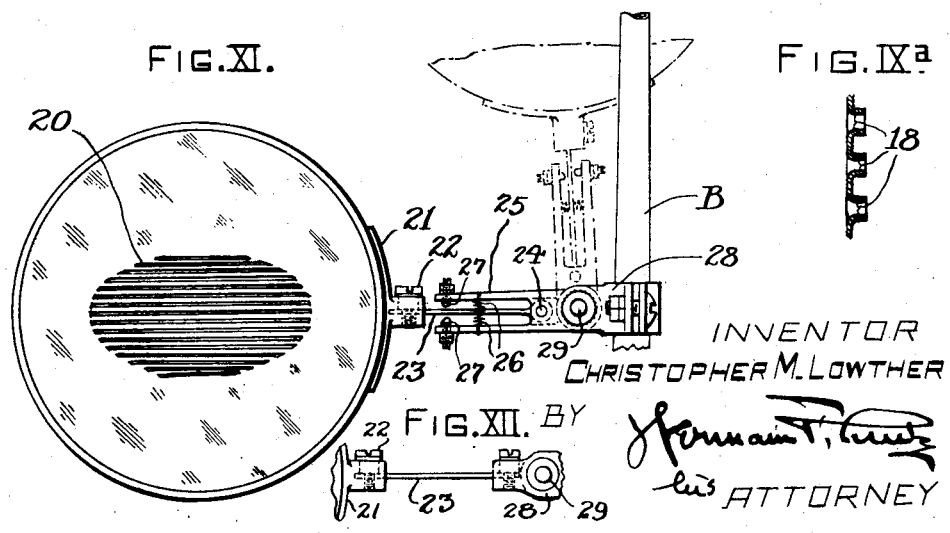
INVENTOR
CHRISTOPHER M. LOWTHER
BY
his ATTORNEY Patented June 22, 1926.

1,589,475

UNITED STATES PATENT OFFICE.

CHRISTOPHER M. LOWTHER, OF NEW YORK, N. Y.

NONGLARE SCREEN FOR AUTOMOBILES.

Application filed September 28, 1923. Serial No. 665,304.

This invention relates to an accessory, which may be in various forms, for automobiles or like vehicles, but in particular for use on automobiles to prevent the glare in the eyes of the driver or occupant emanating from the lights of an approaching vehicle.

It has for its particular object the provision of a simple device readily attached to automobiles in any convenient place, which will cut off the glare of an approaching headlight of an automobile, and still permit all necessary visibility of the objects in front of an automobile.

In its various forms it may be made at low cost, is durable, and its functioning simple, and may be readily attached to any automobile and adjusted to suit the requirements of any particular operator, and also may be made in forms readily adjustable into operative position, or out of position when not needed as in the day time, or when no visible front glare is to be encountered.

While the construction and use of the device may be varied, particular embodiments of my invention are shown in the accompanying drawings forming a part hereof, in which:

Fig. I is a perspective view of an automobile front shield as mounted on a car with the non-glare screen secured thereto.

Fig. II is a section of one panel of the windshield and the screen on the line 2—2 of Fig. I.

Fig. III is a plan view fragmentary, of the screen and adjacent windshield member.

Fig. IV is a fragmentary elevation of the screen and support in the form shown in Fig. I.

Fig. V is a vertical section of windshield with modified form of screen and mounting.

Fig. VI is a plan view of Fig. V.

Fig. VII is a vertical section of the screen form shown in Fig. V, with modified mounting for adjustment.

Fig. VIII is a vertical section showing a further modified mounting of screen.

Fig. IX is an elevation of a screen with perforations. Fig. IX$^a$ is a fragmentary cross-section of the screen plate of Fig. IX showing modified construction of apertures.

Fig. X is a fragmentary view of a screen having elongated perforations or slots.

Fig. XI is an elevation showing a modified form of screen mounted for adjustment in and out of its functioning position.

Fig. XII is a fragmentary view in elevation of a modified vibratory mounting.

As shown in the figures illustrating the mounting of the non-glare screen on an automobile or on any windshield, A is the windshield, B the side supports, C the top panel of the shield, D the adjacent parts of the automobile body, C' is the single adjustable shield panel.

The non-glare screen shown in Figs. I to IV comprises the frame 1 having a perforated field 2, a supporting-bar 3 with hinged pivots 4—4 and clamping nuts 5—5 to clamp the ears 3$^a$ and 3$^b$ depending from the supporting-arm 3 to the frame 1 of the screen. On the shield stanchion B a bracket 6 supports an arm 7 with a clamp 8 and adjusting screw 9 adapted to adjustably hold one end of the bar 3. As here shown the non-glare screen is supported by the bar 3 which is a spring, and therefore holds the screen in a manner to accommodate vibratory motion in the plane of the screen, with relation to the windshield. So supported, the vibration of the automobile, and therefore the windshield, will be transmitted to the screen, by making the spring-bar 3 of a size and dimension so that the vibration going over the rod will cause a vertical oscillation of the screen before the eyes of the driver or occupant of the front seat.

By the adjustment of the clamps 6 and 8, the screen may be readily mounted on a windshield, and its exact position for any particular case can be adjusted to suit the desires of the occupant of the vehicle, so that the non-glare screen is in the line of vision of the occupant when viewing the road ahead, and particularly that portion of the front visibility where glaring headlights or glaring lights of any character are liable to be projected into his eyes. Furthermore, the shield may be tilted by adjustable pivots 4—4 in order to secure the proper angle of the plane of the screen, and to in any other way arrange the screen to meet the best conditions of visibility and vibration. The adjustment may also be made as indicated in dotted lines Fig. I, so as to throw the screen horizontally and thereby out of the way when not in use.

In Figs. V and VIII a screen 2 in frame 1 is secured at top and bottom and at each end by small coil springs 10—10 to clips 11 having their ends bent into clamps 12 binding on the top and bottom edge respectively, of the windshield panes C'. In the modification shown in Fig. VIII the lower clip 13 is extended and serrated, so that the suspension springs 10ª may be clipped to various positions on the arm or bracket 13, in order to position the screen 2 in a vertical position or any desired position with relation to the inclination of the windshield pane 3'. In such modification a clamping rod 14 with springs 15 serves to draw together the clamping ends 12—12 of the top and bottom clips to firmly hold them to the glass plate of the windshield under all conditions of manipulation. As shown in Fig. VIII, a modified form of top and bottom support includes the spring strips 16—16 instead of coil springs 10—10, for the purpose of providing a simplified top and bottom mounting of the screen 2 and its frame 1, and still provide a vibratory support due to the elasticity in the top and bottom support 16 which is secured to the plate of the windshield by clips like 12.

The form of screen shown in Fig. IX involves the frame 1 in which a plate is mounted having a large number of perforations 17. These perforations may be in regular rectangular arrangement or may be in staggered arrangement, but provide a large aggregate area of small openings with intermediate portions of the screen which are preferably opaque, or, in any event, of far lesser transparency than afforded by the apertures. The aggregate area of the apertures must be substantially less than the intermediate opaque area, so that with the rapid vibration of the screen in the line of vision from the eye to a glaring light, there will be a constant and automatic cutting off of an appreciable amount of the light, and at the same time the cutting off of a proportion of the intensity of the light will not obscure the outline and character of the objects in the line of vision, which latter by the vibration of the screen are for all practical purposes clearly visible. Under certain conditions of use it is found advantageous to have the perforations of the screen 2 each formed as short tubular projections 18—18, shown in Fig. IXª, which may be readily accomplished in the case of metal sheets by puncturing all one side, thereby driving the material with a sharp punch into a short tubular form, after which the ragged edges so produced may be removed, and the screen fashioned as a finished article without objectionable features.

The form of screen shown in Fig. X has a large number of slits 19 throughout the entire area of the field of screen desired, and these slits constitute an aggregate area of the desired proportion to the area of the intermediate plane of the screen, to such exent as to cut off, when vibrating the screen, the amount of light intensity which it is found for the particular purpose to be most effective.

In the case of the form shown in Fig. XI, the screen 20 is formed circular and may be perforated throughout its area with holes as in Fig. IX, or with slits, and in this construction provides for ready attachment and support of a simplified vibratory mounting on the windshield stanchion B, or other fixed part of the vehicle or vehicle body. The support 21 has a clamp 22 with vibrator blade 23 pivoted at 24 on the bracket 25, with, if desired, additional springs 26 and limiting contacts 27—27 adapted to engage the blade 23 when subjected to the vibration of the car. By attaching the bracket 25 to clamp 28 by means of pivot 29, the entire shield and its bracket can be oscillated to a position out of the range of vision when not needed, as shown in dotted lines. However, the vibratory blade 23 may be made of such dimensions and strength as to amply support and provide for the vibration of screen 20, as shown in Fig. XII, thus providing a simplified mechanism and a cheaper article.

The non-glare screen is preferably made of thin weatherproof metal, or with weatherproof treatment to provide durability under all weather conditions. The frame surrounding the screen is preferably made of metal, and is proportioned, particularly as to weight, with respect to the screen, in a way that will provide a total weight of screen and frame suitable to support or compound the vibration automatically. In some cases celluloid may be used not wholly opaque, and for commercial articles these would be of a character providing all durability to maintain their characteristics and to weather extensive use. Any material suitable as to the main requirements would be mounted in such manner as to provide the necessary weight to meet the conditions of vibration. In general, the vibrating parts would be light, and involve a minimum of inertia of rest to assure their vibration, and would be duly proportioned with respect to the sensitiveness of the mounting springs, blades or other mechanism adapted to support them for their particular functioning, and also to properly support them against derangement owing to extraordinary shock or accident.

It will be noted that preferably the screen is positioned to the rear of the glass of the windshield and is thereby protected at the same time being brought into the desired relative position between the eye of vision and the glare. Any perforated plate however, may be individually protected by a transparent plate on one or both sides to prevent the accumulation of dust or dirt. While as herein shown the non-glare screen is mounted in various ways to automatically provide for the desired vibration, additional mechanism may be provided to assure forced vibration of the most advantageous periodicity. Such might be hand operated or automatically operated by a member of greater weight and mechanism to vibrate the relatively lighter screen, or connections with means carried by the vehicle involving a mechanism, and driven vibrating connection may in some cases serve to provide the same results in more efficient or more regular ways. Likewise, the screen may be made of a size sufficient to provide only a portion of its area for non-glare use as shown in Fig. XI.

It will thus be seen that the practical use of this invention involves a mechanism which may be extremely simple, and consist primarily of a suitably perforated plate or sheet, of the desired size, mounted or with means to provide vibration in the plane or substantially in the plane of the perforated sheet. Such devices would constitute an accessory readily attached and adjusted to an automobile, or for any non-glare screening purposes, and may also in suitable form be permanently embodied in a windshield or in proper position with or without a windshield. As an accessory they may be made extremely simple and durable and supplied with means for mounting on any of the various standard forms of parts such as windshield sides, frame, or the parts of the automobile bodies adjacent to the operator as by a bracket supported to the underside of the roof of a closed body adapted to be sprung down in operative position and held and protected out of the way against the roof when not in use.

By providing the section of perforated sheet adapted to be positioned at will suitably in the line of vision between the eye and origin of glaring lights, and providing means for suitably vibrating such a screen across the plane of vision, a proportion of the light intensity is cut off, and thereby the light reaching the eye is reduced to such degree as to eliminate the glare dangerous in operating a motor car or the like, while at the same time accomplishing this result without interfering with the general visibility of approaching objects or stationary objects in the foreground.

Many variations may be made from the particular embodiments of my invention herein shown and described in detail without departing from the spirit of my invention, but what I claim and desire to secure by Letters Patent is.

1. A non-glare device for embodiment in an automobile or the like, comprising a perforated sheet of relatively light weight stiff material, a support therefor, interconnecting springs between said sheet and said support whereby vibration in the plane of the sheet is permitted irrespective of the motion of the support.

2. A non-glare screen for automobiles comprising a plate having a large number of relatively small uniformly spaced cleancut perforations less in total area than the area between the perforations, means for mounting said screen in a substantially vertical position on a fixed part of an automobile, supporting means yieldable in the plane of the plate whereby vibration of the plate is permitted with respect to the fixed part of an automobile and across the line of vision of the occupant.

3. A device to cut off light glare from the eyes of an observer and retain clear vision, comprising a screen having a substantially uniform arrangement of alternate areas relatively small to the whole screen, the two series of areas being of different degrees of transparency, one area of greater transparency and the other of sub-transparency, and said areas of sub-transparency aggregating a substantially greater portion of the screen than the other areas, a support for said screen and sensitive yielding means holding the screen to said support whereby vibration of the screen in its plane is permitted.

4. A device to cut off light glare from the eyes of an observer and permit of clear vision, comprising a screen having a multiplicity of relatively small areas substantially regularly disposed on said screen of diminished transparency compared with the intervening areas, both sides of said screen including a contiguous plate surface of transparent material affording clear vision for the multiplicity areas of greater transparency, a support for said screen and means for yieldingly holding said screen in said support whereby vibratory motion with respect to the support is permitted.

5. A glare screen for automobiles, comprising a plate with manifold perforations aggregating in area less than the total area of the intervening opaque portions of the plate, means for holding the screen in the line of forward vision of the observer occupant, and means of support for the plate to permit vibration within a range of predetermined periodicity.

6. A non-glare device for forward view of the driver of a vehicle or the like, comprising a screen embodying a transparent plate, means associated with said plate to provide a multiplicity of relatively small areas regularly disposed over said plate of lesser transparency than said plate, a bracket for attachment of the same to a vehicle part, spring connections between the screen and the bracket whereby oscillation of the screen in direction of its surface is permitted with respect to the fixed part of the vehicle.

7. A non-glare screen for automobiles comprising a transparent plate, means on one side of said plate of lesser transparency and having a multiplicity of regularly disposed clear vision areas permitting light directly through said transparent plate, a bracket to support said screen, intermediate yielding connections in the plane of the screen between it and the support, whereby vibration in the plane of the screen is permitted.

8. An automobile non-glare screen comprising a sheet with a multiplicity of small perforations with intervening opaque areas, a support for said screen, a bracket to hold said support out of operative position and by adjustment to support the screen in operative position, yielding connections between said support and screen, whereby the screen will vibrate in the plane of the screen out of synchronism with but due to the vibration of the vehicle 9. A device to cut strength of light rays from the eyes of an observer, comprising a plate having a multiplicity of relatively small clear vision apertures and neighboring subtransparent areas in ratio of areas to cut off a predetermined proportion of the glare light, a fixed support and intermediate means between the support and the plate yieldable in the direction of the plane of the plate, whereby vibration of the plate is permitted with respect to the fixed support across the line of vision.

In testimony whereof, I have signed my name to this application, this 21st day of September, 1923.

CHRISTOPHER M. LOWTHER.